US009223460B2

(12) United States Patent
Naranjo et al.

(10) Patent No.: US 9,223,460 B2
(45) Date of Patent: Dec. 29, 2015

(54) TOOLBAR SEARCH CENTERED USER INTERFACE MODEL

(75) Inventors: Felipe Luis Naranjo, Seattle, WA (US); Nathan Deepak Jhaveri, Bellevue, WA (US); Diego David Baca Del Rosario, Seattle, WA (US); Paul Ronald Ray, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1198 days.

(21) Appl. No.: 12/971,895

(22) Filed: Dec. 17, 2010

(65) Prior Publication Data

US 2012/0159377 A1 Jun. 21, 2012

(51) Int. Cl.
*G06F 3/048* (2013.01)
*G06F 3/0481* (2013.01)

(52) U.S. Cl.
CPC .......... *G06F 3/0481* (2013.01); *G06F 3/04817* (2013.01)

(58) Field of Classification Search
CPC ..................................... G09F 3/0481
USPC ......................................... 715/780
See application file for complete search history.

(56) References Cited

U.S. PATENT DOCUMENTS

| 6,519,618 B1* | 2/2003 | Snyder ........................... 707/738 |
| 2003/0221167 A1* | 11/2003 | Goldstein et al. ............. 715/513 |
| 2005/0039144 A1 | 2/2005 | Wada |
| 2007/0088897 A1* | 4/2007 | Wailes et al. ..................... 711/3 |
| 2007/0157118 A1 | 7/2007 | Wuttke |
| 2009/0144723 A1* | 6/2009 | Hartin et al. .................. 717/173 |
| 2009/0164922 A1 | 6/2009 | Phakausonh |
| 2010/0082670 A1* | 4/2010 | Chan et al. ..................... 707/770 |
| 2010/0223664 A1* | 9/2010 | Naranjo et al. ................. 726/10 |

OTHER PUBLICATIONS

Ross, John, SharePoint Search Center uses minimal.master—and why you should care about that—Published Date: May 12, 2010 http://www.sharepoint911.com/blogs/john/archive/2010/05/12/sharepoint-search-center-uses-minimal-master-%E2%80%93-and-why-you-should-care-about-that.aspx.
Microsoft Corporation, Plan the end-user search experience (Office SharePoint Server)—Published Date: Feb. 2, 2009 http://technet.microsoft.com/en-us/library/cc263089(office.12).aspx.
NPL Staff in the Know—Published Date: May 25, 2009 http://npltech.wordpress.com/.
How to Integrate Facebook in Firefox Browser—Published Date: Jan. 9, 2010 http://www.honeytechblog.com/integrate-facebook-in-firefox/.
Basu, Saikat, PDF-XChange Viewer—Give This Free PDF Reader a Second Look—Published Date: Mar. 9, 2010 http://www.makeuseof.com/tag/pdfxchange-viewer-give-free-pdf-reader/.

\* cited by examiner

*Primary Examiner* — Boris Pesin
*Assistant Examiner* — Angie Badawi
(74) *Attorney, Agent, or Firm* — Jessica Meyers; Jim Ross; Micky Minhas (57) ABSTRACT

Embodiments of the present invention relate to systems, methods, and computer-storage media for organizing presentation of browser toolbars. In one embodiment, a toolbar of a web browser is presented. The toolbar has a search input box. Additionally, one or more application icons are presented on each of at least two sides of the search input box. An indication that a user has engaged an application icon of the toolbar is received. Further, an application window is presented beneath the search input box of the toolbar. The application window comprises content associated with the application icon.

14 Claims, 8 Drawing Sheets

TOOLBAR SEARCH CENTERED USER INTERFACE MODEL

BACKGROUND

Many web browsers have a search box on a toolbar that generates relatively few searches. Rather than entering a search into a web browser toolbar, many users have become accustomed to navigating to a search engine website and then entering a search term. As such, users generally use a two-step process that requires loading the search engine website before entering a search query. By encouraging users to utilize a search box on a toolbar of a web browser, web browsers can increase the number of search queries input into the search box of the toolbar and increase the efficiency of searches for users.

SUMMARY

This Summary is provided to introduce a selection of concepts in a simplified form that are further described below in the Detailed Description. This Summary is not intended to identify essential features of the claimed subject matter, nor is it intended to be used as an aid in isolation to determine the scope of the claimed subject matter. Embodiments of the present invention provide methods for organizing presentation of browser toolbars. In particular, methods are provided for presenting a search box in a centralized location of a tool bar to engage a user.

DRAWINGS

Embodiments of the invention are described in detail below with reference to the attached drawing figures, wherein.

DETAILED DESCRIPTION

The subject matter of embodiments of the invention disclosed herein is described with specificity to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Embodiments of the present invention provide methods for organizing presentation of web browser toolbars. In particular, methods are provided for presenting a search box at a centralized location of a toolbar of a web browser. The search box is placed in a centralized location so as to engage a user. The placement of the search box in a centralized location makes search the central focus of activity. Additionally, application icons are presented on at least the left side of the search box. The application icons may also be placed directly to the left of the search box. Accordingly, the application icons are also in a centralized location as they are directly to the left of the search box. In this way, even when the user is interacting with application icons, the search box is still within the centralized location of the activity along with the application icons. Application icons may also be placed directly to the right of the search box. As such, application icons placed directly to the right of the search box are also in a centralized location.

When a user interacts with an application icon, an application panel may be presented directly below the search box. The application panel may be attached to the search box. Alternatively, the application panel may be detached from the search box. For example, the application panel may be detached and hover directly beneath the search box. Further, the application panel may present content associated with the application icon that was engaged by the user. For example, when a user interacts with an application icon related to news, the application panel may contain newsfeeds. The newsfeeds may be updated during the period that the user is interacting with the application panel. Further, the application panel may expire after a pre-determined amount of time.

The content of the application panel may be used to suggest search queries for the search box. For example, as a user enters a geographic destination address into an application panel associated with traffic, a suggested search term may be the city or neighborhood associated with that destination address. Further, suggested search terms may be based on popular tourist locations near the destination address.

Various aspects of embodiments of the invention may be described in the general context of computer program products that include computer code or machine-useable instructions, including computer-executable instructions such as applications and program modules, being executed by a computer or other machine, such as a personal data assistant or other handheld device. Generally, program modules including routines, programs, objects, components, data structures, etc., refer to code that perform particular tasks or implement particular abstract data types. Embodiments of the invention may be practiced in a variety of system configurations, including dedicated servers, general-purpose computers, laptops, more specialty computing devices, and the like. The invention may also be practiced in distributed computing environments where tasks are performed by remote-processing devices that are linked through a communications network.

Figure 1:
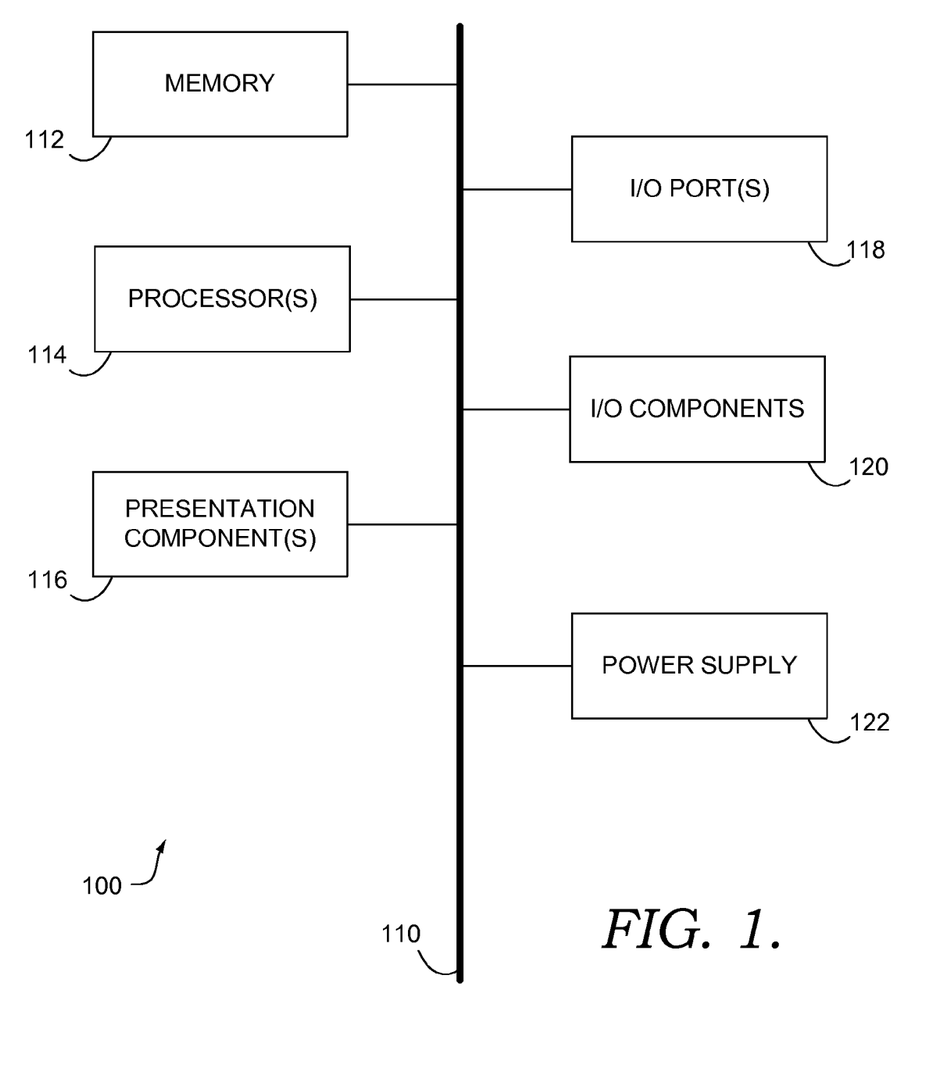
FIG. 1 is a block diagram illustrating an exemplary computing device suitable for use in connection with embodiments of the present invention.

An exemplary operating environment in which various aspects of the present invention may be implemented is described below in order to provide a general context for various aspects of the present invention. Referring initially to FIG. 1 in particular, an exemplary operating environment for implementing embodiments of the present invention is shown and designated generally as computing device 100. Computing device 100 is but one example of a suitable computing environment and is not intended to suggest any limitation as to the scope of use or functionality of the invention. Neither should computing device 100 be interpreted as having any dependency or requirement relating to any one or combination of components illustrated.

Computing device 100 includes a bus 110 that directly or indirectly couples the following devices: memory 112, one or more processors 114, one or more presentation components 116, input/output ports 118, input/output components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be gray and fuzzy. For example, one may consider a presentation component such as a display device to be an I/O component. Also, processors have memory. We recognize that such is the nature of the art, and reiterate that the diagram of FIG. 1 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 1 and reference to "computing device."

Additionally, computing device 100 typically includes a variety of computer-readable media. Computer-readable media can be any available media that can be accessed by computing device 100 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data.

Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 100. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 112 includes computer-executable instructions 113 stored in volatile and/or nonvolatile memory. The memory may be removable, nonremovable, or a combination thereof. Exemplary hardware devices include solid-state memory, hard drives, optical-disc drives, etc. Computing device 100 includes one or more processors 114 coupled with system bus 110 that read data from various entities such as memory 112 or I/O components 120. In an embodiment, the one or more processors 114 execute the computer-executable instructions 113 to perform various tasks and methods defined by the computer-executable instructions 115. Presentation component(s) 116 are coupled to system bus 110 and present data indications to a user or other device. Exemplary presentation components 116 include a display device, speaker, printing component, etc.

I/O ports 118 allow computing device 100 to be logically coupled to other devices including I/O components 120, some of which may be built in. Illustrative components include a microphone, joystick, game pad, satellite dish, scanner, printer, wireless device, keyboard, pen, voice input device, touch input device, touch-screen device, interactive display device, or a mouse. I/O components 120 can also include communication connections 121 that can facilitate communicatively connecting the computing device 100 to remote devices such as, for example, other computing devices, servers, routers, and the like.

Figure 2:
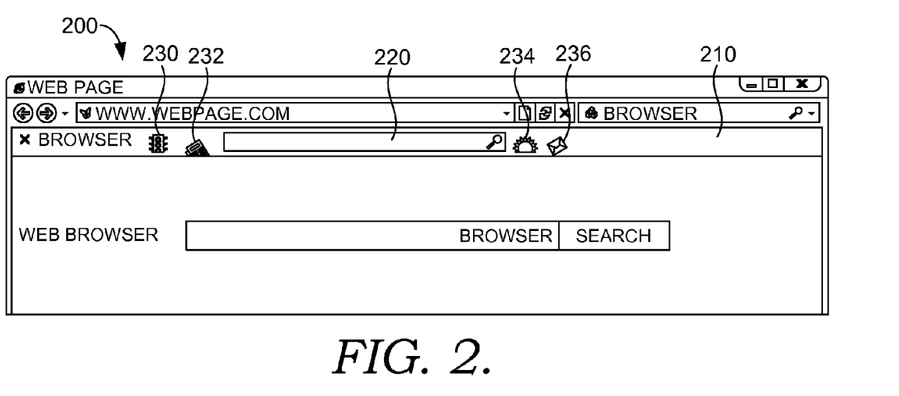
FIG. 2 is a schematic diagram illustrating an exemplary toolbar for organizing presentation of browser toolbars, in accordance with an embodiment of the present invention.

FIG. 2 is a schematic diagram 200 illustrating an exemplary toolbar 210 for organizing presentation of browser toolbars, in accordance with an embodiment of the present invention. In particular, toolbar 210 comprises search box 220 and application icons 230, 232, 234, and 236. Search box 220 is presented at a horizontally centralized location of toolbar 210. Additionally, search box 220 has application icons 230, 232, 234, and 236. Application icon 230 is associated with traffic; application icon 232 is associated with news; application icon 234 is associated with weather; and application icon 236 is associated with e-mail. Further, Application icons 230 and 232 are presented directly left of search box 220 and application icons 234 and 236 are presented directly right of search box 220.

Figure 3:
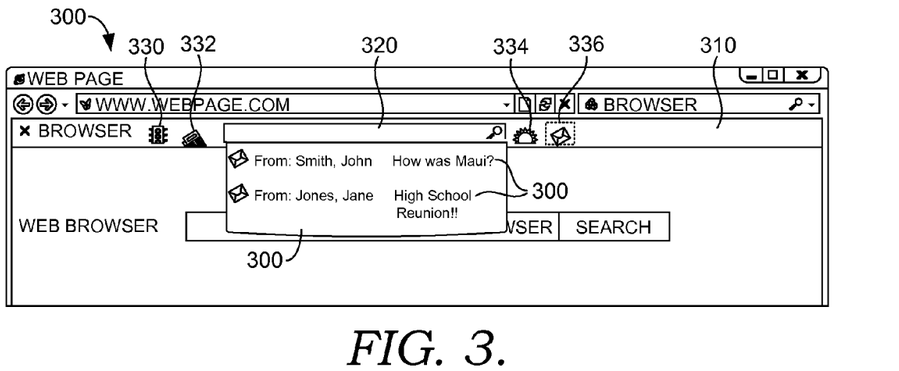
FIG. 3 is a schematic diagram illustrating an exemplary toolbar having an application panel associated with a first application for organizing presentation of browser toolbars, in accordance with an embodiment of the present invention.

FIG. 3 is a schematic diagram 300 illustrating an exemplary toolbar 310 having an application panel associated with a first application for organizing presentation of browser toolbars, in accordance with an embodiment of the present invention. In particular, toolbar 310 comprises search box 320, application icons 330, 332, 334, and 336, and application panel 340. Search box 320 is presented at a horizontally centralized location of toolbar 310. Additionally, search box 320 has application icons 330, 332, 334, and 336. Application icon 330 is associated with traffic; application icon 332 is associated with news; application icon 334 is associated with weather; and application icon 336 is associated with e-mail.

Similar to application icons seen in FIG. 2, application icons 330 and 332 are presented directly left of search box 320 and application icons 334 and 336 are presented directly right of search box 320. Further, application icon 332 is selected and application icons 330, 334, and 336 are unselected. An application icon is "selected" when a user interacts with the application icon.

Application panel 340 is presented directly beneath search box 320. Application panel 340 may be attached to search box 320. Alternatively, application panel 340 may be detached from search box 320. For example, application panel 340 may hover detached beneath search box 320. Further, while illustrated embodiments show the width of search box 320 matching the width of application panel 340, the widths of application panel 340 and/or search box 320 need not be constant and, in fact, may be varied based on user preferences.

Content within application panel 340 may be associated with an application icon. In particular, application panel 340 may contain content associated with selected application icon 332. Since selected application icon 332 is associated with e-mails, application panel 340 may contain e-mails 342 associated with application icon 332.

Figure 4:
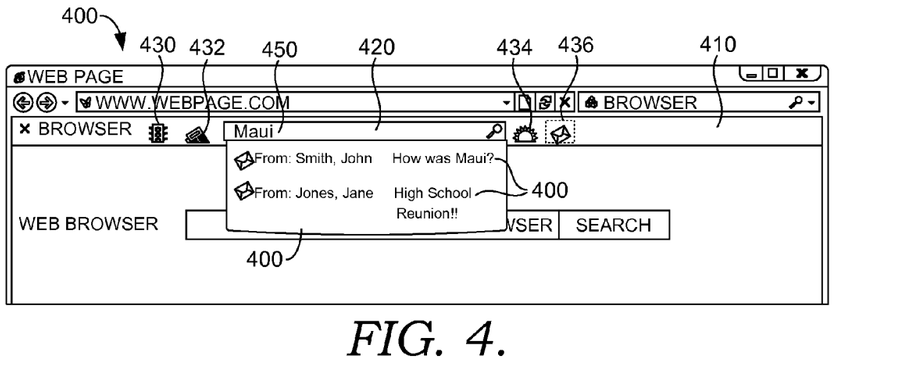
FIG. 4 is a schematic diagram illustrating an exemplary toolbar having an application panel associated with a first application and a search box populated with a suggested search query, in accordance with an embodiment of the present invention.

In addition to presenting content associated with application icons, an application panel may also be used to propose search words to be presented in a search box. Accordingly, FIG. 4 is a schematic diagram 400 illustrating an exemplary toolbar 410 having an application panel associated with a first application and a search box populated with a suggested search query, in accordance with an embodiment of the present invention. In particular, toolbar 410 comprises search box 420, application icons 430, 432, 434, and 436, and application panel 440. Search box 420 is presented at a horizontally centralized location of toolbar 410. Additionally, search box 420 has application icons 430, 432, 434, and 436. Application icon 430 is associated with traffic; application icon 432 is associated with news; application icon 434 is associated with weather; and application icon 436 is associated with e-mail. Similar to application icons seen in FIGS. 2 and 3, application icons 430 and 432 are presented directly left of search box 420 and application icons 434 and 436 are presented directly right of search box 420. Further, application icon 436 is selected and application icons 430, 432, and 434 are unselected.

Application panel 440 is presented directly beneath search box 420. Application panel 440 may be attached to search box 420. Alternatively, application panel 440 may be detached from search box 420. For example, application panel 440 may hover detached beneath search box 420. Further, while illustrated embodiments show the width of search box 420 matching the width of application panel 440, the widths of application panel 440 and/or search box 420 need not be constant and, in fact, may be varied based on user preferences.

Content within application panel 440 may be associated with an application icon. In particular, application panel 440 may contain content associated with selected application icon 436. Since selected application icon 436 is associated with e-mails, application panel 440 may contain e-mails 442 and 444 associated with application icon 436. As seen in FIG. 4, e-mail 442 has a subject, "How was Maui?" In embodiments, search query 450 may be based on contents of application panel 440. In particular, search query 450 may be "Maui" based on the subject of e-mail 442. Accordingly, contents of application panel 440 may be used to suggest search queries to be input at search box 420.

Figure 5:
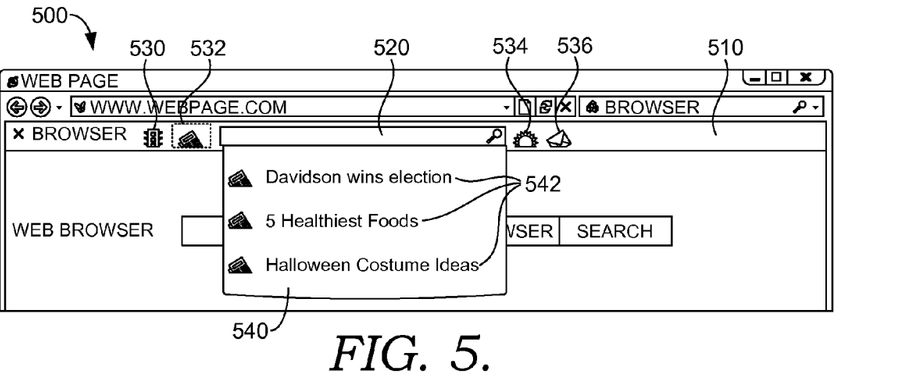
FIG. 5 is a schematic diagram illustrating an exemplary toolbar having an application panel associated with a second application for organizing presentation of browser toolbars, in accordance with an embodiment of the present invention.

FIG. 5 illustrates an application panel associated with a second application. In particular, FIG. 5 is a schematic diagram 500 illustrating an exemplary toolbar 510 having an application panel associated with a second application for organizing presentation of browser toolbars, in accordance with an embodiment of the present invention. In particular, toolbar 510 comprises search box 520, application icons 530, 532, 534, and 536, and application panel 540. Search box 520 is presented at a horizontally centralized location of toolbar 510. Additionally, search box 520 has application icons 530, 532, 534, and 536. Application icon 530 is associated with traffic; application icon 532 is associated with news; application icon 534 is associated with weather; and application icon 536 is associated with e-mail. Similar to application icons seen in FIGS. 2-4, application icons 530 and 532 are presented directly left of search box 520 and application icons 534 and 536 are presented directly right of search box 520. Further, application icon 532 is selected and application icons 530, 534, and 536 are unselected.

Application panel 540 is presented directly beneath search box 520. Application panel 540 may be attached to search box 520. Alternatively, application panel 540 may be detached from search box 520. For example, application panel 540 may hover detached beneath search box 520. Further, while illustrated embodiments show the width of search box 520 matching the width of application panel 540, the widths of application panel 540 and/or search box 520 need not be constant and, in fact, may be varied based on user preferences.

Content within application panel 540 may be associated with an application icon. In particular, application panel 540 may contain content associated with selected application icon 532. Since selected application icon 532 is associated with news, application panel 540 may contain newsfeeds 542 associated with application icon 532. Further, the height of application panel 540 may be dependent upon the application icon that is associated with application panel 540. Accordingly, application panel 540 that is associated with application icon 532 is taller than application panel 440 of FIG. 4 that is associated with application icon 436.

Figure 6:
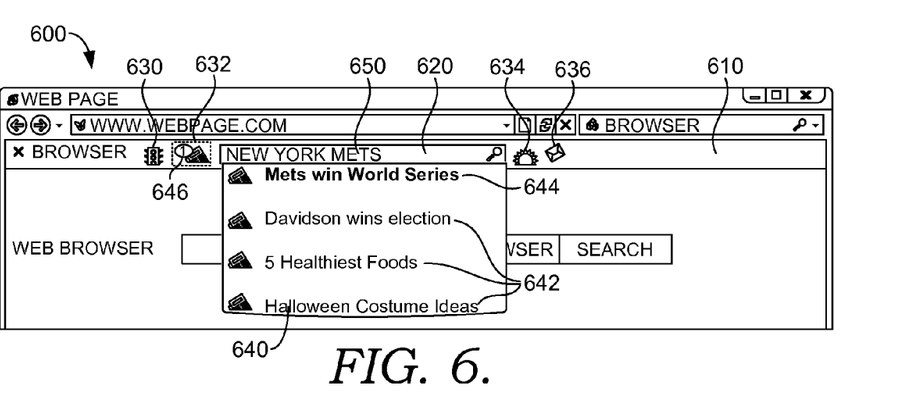
FIG. 6 is a schematic diagram illustrating an exemplary toolbar having an updated application panel associated with a second application, in accordance with an embodiment of the present invention.

FIG. 6 is a schematic diagram 600 illustrating an exemplary toolbar 610 having an updated application panel associated with a second application, in accordance with an embodiment of the present invention. In particular, toolbar 610 comprises search box 620, application icons 630, 632, 634, and 636, and application panel 640. Search box 620 is presented at a horizontally centralized location of toolbar 610. Additionally, search box 620 has application icons 630, 632, 634, and 636. Application icon 630 is associated with traffic; application icon 632 is associated with news; application icon 634 is associated with weather; and application icon 636 is associated with e-mail. Similar to application icons seen in FIGS. 2-5, application icons 630 and 632 are presented directly left of search box 620 and application icons 634 and 636 are presented directly right of search box 620. Further, application icon 632 is selected and application icons 630, 634, and 636 are unselected.

Application panel 640 is presented directly beneath search box 620. Application panel 640 may be attached to search box 620. Alternatively, application panel 640 may be detached from search box 620. For example, application panel 640 may hover detached beneath search box 620. Further, while illustrated embodiments show the width of search box 620 matching the width of application panel 640, the widths of application panel 640 and/or search box 620 need not be constant and, in fact, may be varied based on user preferences.

Content within application panel 640 may be associated with an application icon. In particular, application panel 640 may contain content associated with selected application icon 632. Since selected application icon 632 is associated with news, application panel 640 may contain newsfeeds 642 and 644 associated with application icon 632. Further, as newsfeeds are updated, updated newsfeeds may be differentiated from older newsfeeds. Accordingly, updated newsfeed 644 may be emboldened in relation to older newsfeeds 642. Additionally, updated newsfeed 644 may be associated with a notification 646 on application icon 632.

As seen in FIG. 6, updated newsfeed 644 has a title, "Mets win World Series." In embodiments, search query 650 may be based on contents of application panel 640. In particular, search query 650 may be "New York Mets" based on the title of updated newsfeed 644. Accordingly, contents of application panel 640 may be used to suggest search queries to be input at search box 620.

Figure 7:
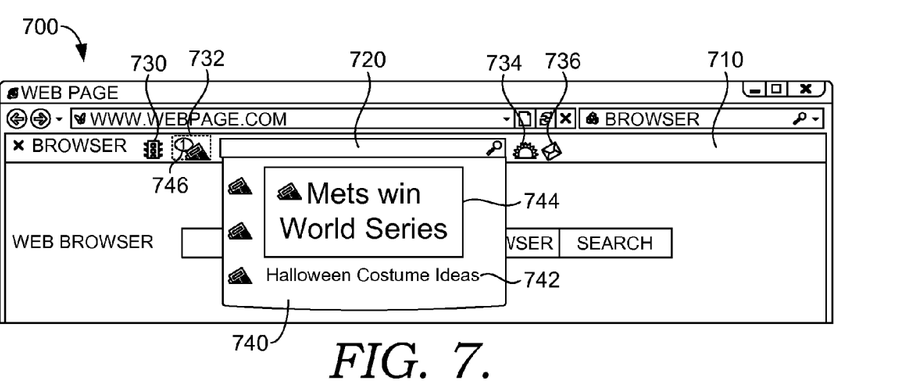
FIG. 7 is a schematic diagram illustrating an exemplary toolbar having an application panel associated with a second application and a notification panel associated with the second application, in accordance with an embodiment of the present invention.

FIG. 7 is a schematic diagram 700 illustrating an exemplary toolbar 710 having an application panel associated with a second application and a notification panel associated with the second application, in accordance with an embodiment of the present invention. In particular, toolbar 710 comprises search box 720, application icons 730, 732, 734, and 736, and application panel 740. Search box 720 is presented at a horizontally centralized location of toolbar 710. Additionally, search box 720 has application icons 730, 732, 734, and 736. Application icon 730 is associated with traffic; application icon 732 is associated with news; application icon 734 is associated with weather; and application icon 736 is associated with e-mail. Similar to application icons seen in FIGS. 2-6, application icons 730 and 732 are presented directly left of search box 720 and application icons 734 and 736 are presented directly right of search box 720. Further, application icon 732 is selected and application icons 730, 734, and 736 are unselected.

Application panel 740 is presented directly beneath search box 720. Application panel 740 may be attached to search box 720. Alternatively, application panel 740 may be detached from search box 720. For example, application panel 740 may hover detached beneath search box 720. Further, while illustrated embodiments show the width of search box 720 matching the width of application panel 740, the widths of application panel 740 and/or search box 720 need not be constant and, in fact, may be varied based on user preferences.

Content within application panel 740 may be associated with an application icon. In particular, application panel 740 may contain content associated with selected application icon 732. Since selected application icon 732 is associated with news, application panel 740 may contain newsfeeds 742 and 744 associated with application icon 732. Further, as newsfeeds are updated, updated newsfeeds may be differentiated from older newsfeeds. Accordingly, updated newsfeed 744 may be presented differently than older newsfeeds 742. As seen in FIG. 7, newsfeed 744 is presented in a separate window that is shown in front of application panel 740. Additionally, updated newsfeed 744 may be associated with a notification 746 on application icon 732.

Figure 8:
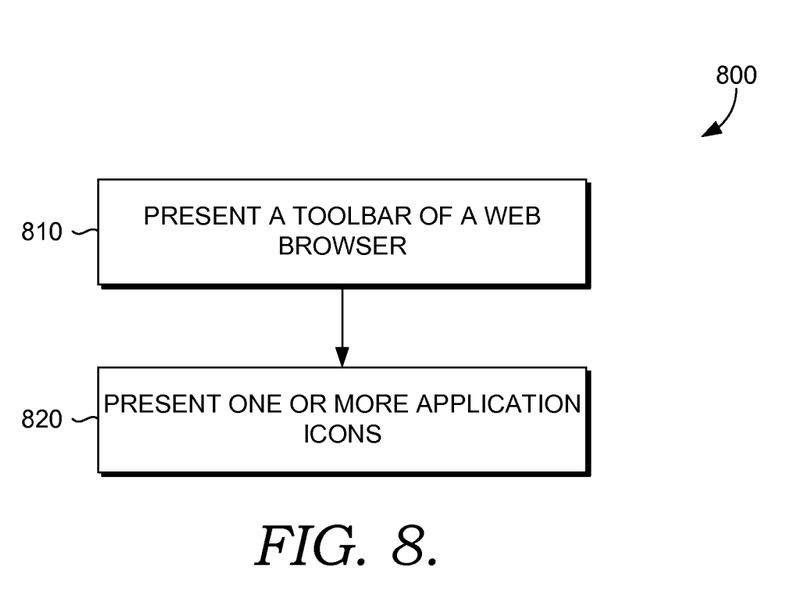
FIG. 8 is a flow diagram illustrating a method for organizing presentation of browser toolbars, in accordance with an embodiment of the present invention.

Turning now to FIG. 8, a flow diagram 800 is shown illustrating a method for organizing presentation of browser toolbars, in accordance with an embodiment of the present invention. At step 810, a toolbar of a web browser is presented. The toolbar has a search input box. Additionally, the search input box may be presented at a centralized location of the toolbar. At step 820, one or more application icons are presented. In particular, the one or more application icons may be presented directly next to the search input box. In embodiments, an indicator that a user has engaged an application of the one or more application icons may be received. Further, an application window may be presented beneath the search input box of the toolbar. The application window may comprise content associated with the application icon.

Figure 9:
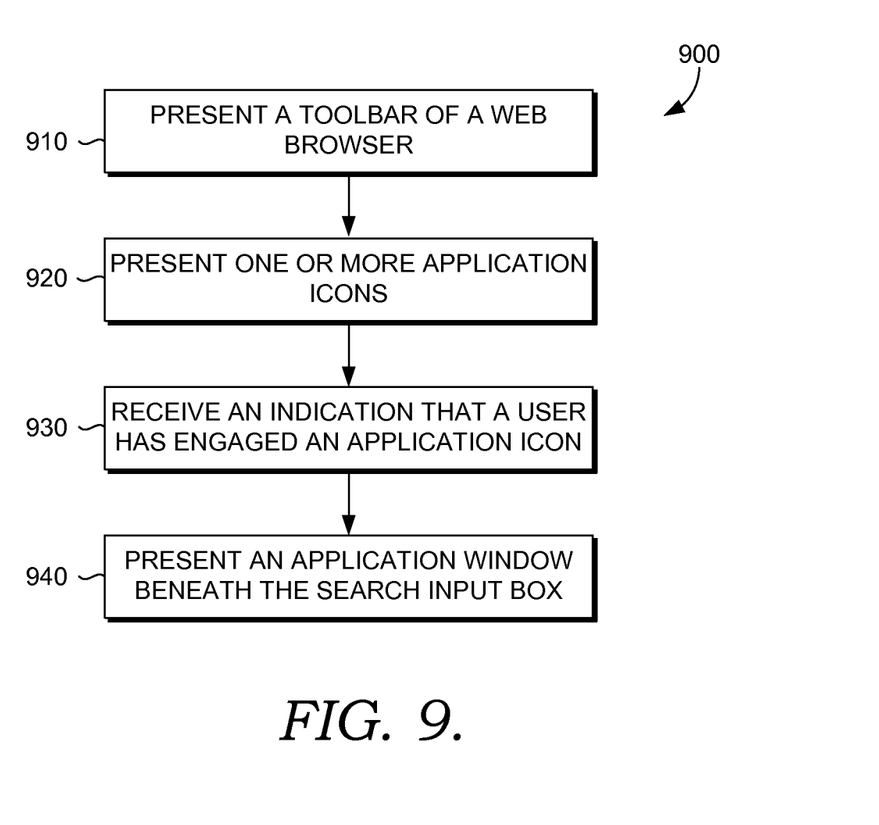
FIG. 9 is another flow diagram illustrating a method for organizing presentation of browser toolbars, in accordance with an embodiment of the present invention.

FIG. 9 is another flow diagram 900 illustrating a method for organizing presentation of web browser toolbars, in accordance with an embodiment of the present invention. At step 910, a toolbar of a web browser is presented. The toolbar may have a search input box. Further, the search input box may be centered in the toolbar of the web browser. At step 920, one or more application icons are presented. At step 930, an indication is received that a user has engaged an application icon. At step 940, an application window is presented beneath the search input box. The method may further comprise determining a search query based on content of the application window. Additionally, the search input box may be populated with the search query based on content of the application window.

Figure 10:
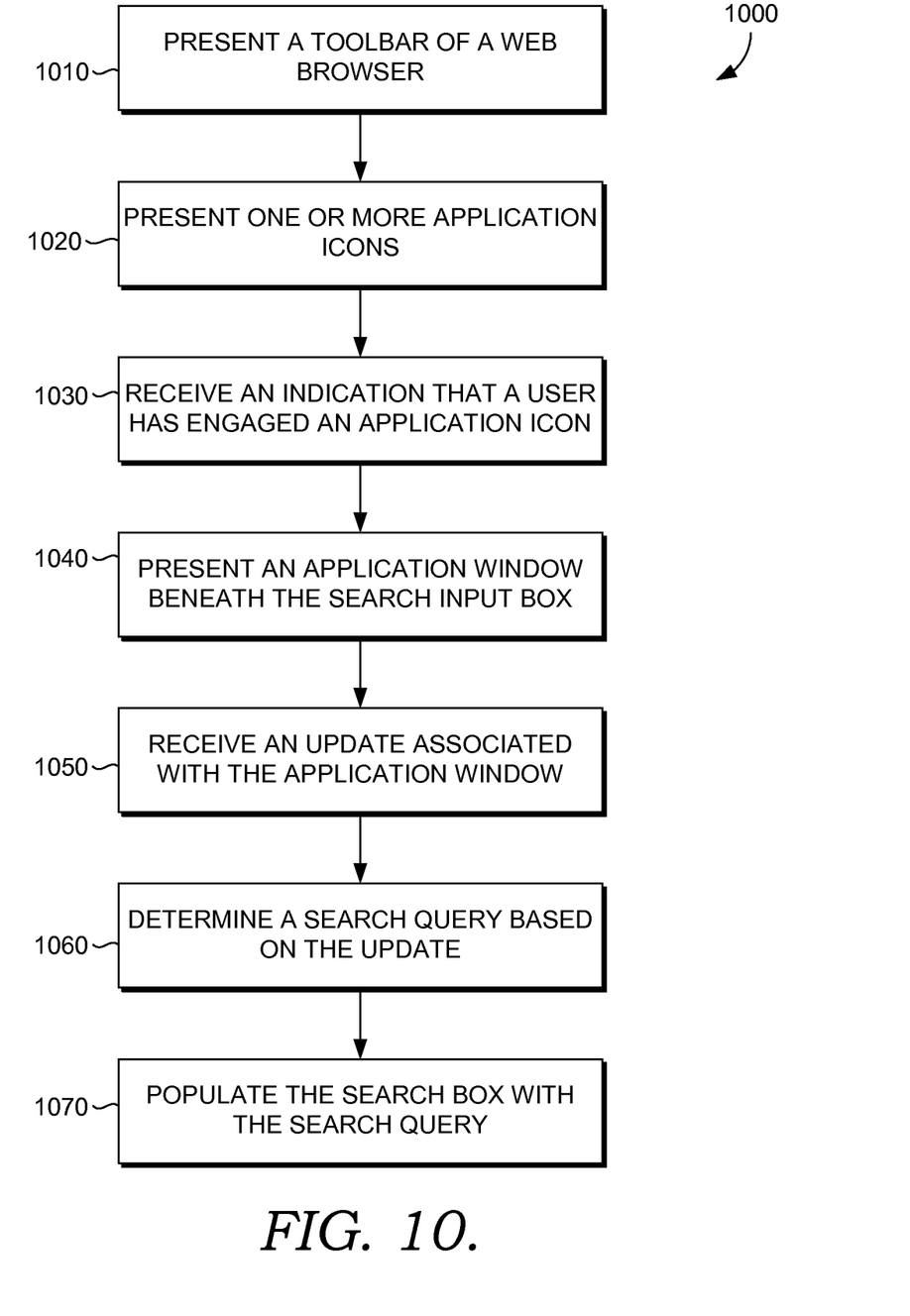
FIG. 10 is a further flow diagram illustrating a method for organizing presentation of browser toolbars, in accordance with an embodiment of the present invention.

FIG. 10 is a further flow diagram 1000 illustrating a method for organizing presentation of browser toolbars, in accordance with an embodiment of the present invention. At step 1010, a toolbar of a web browser is presented. At step 1020, one or more application icons are presented. At step 1030, an indication is received that a user has engaged an application icon. At step 1040, an application window is presented beneath the search input box. At step 1050, an update associated with the application window is received. At step 1060, a search query is determined based on the update. At step 1070, the search box is populated with the search query.

Figure 11:
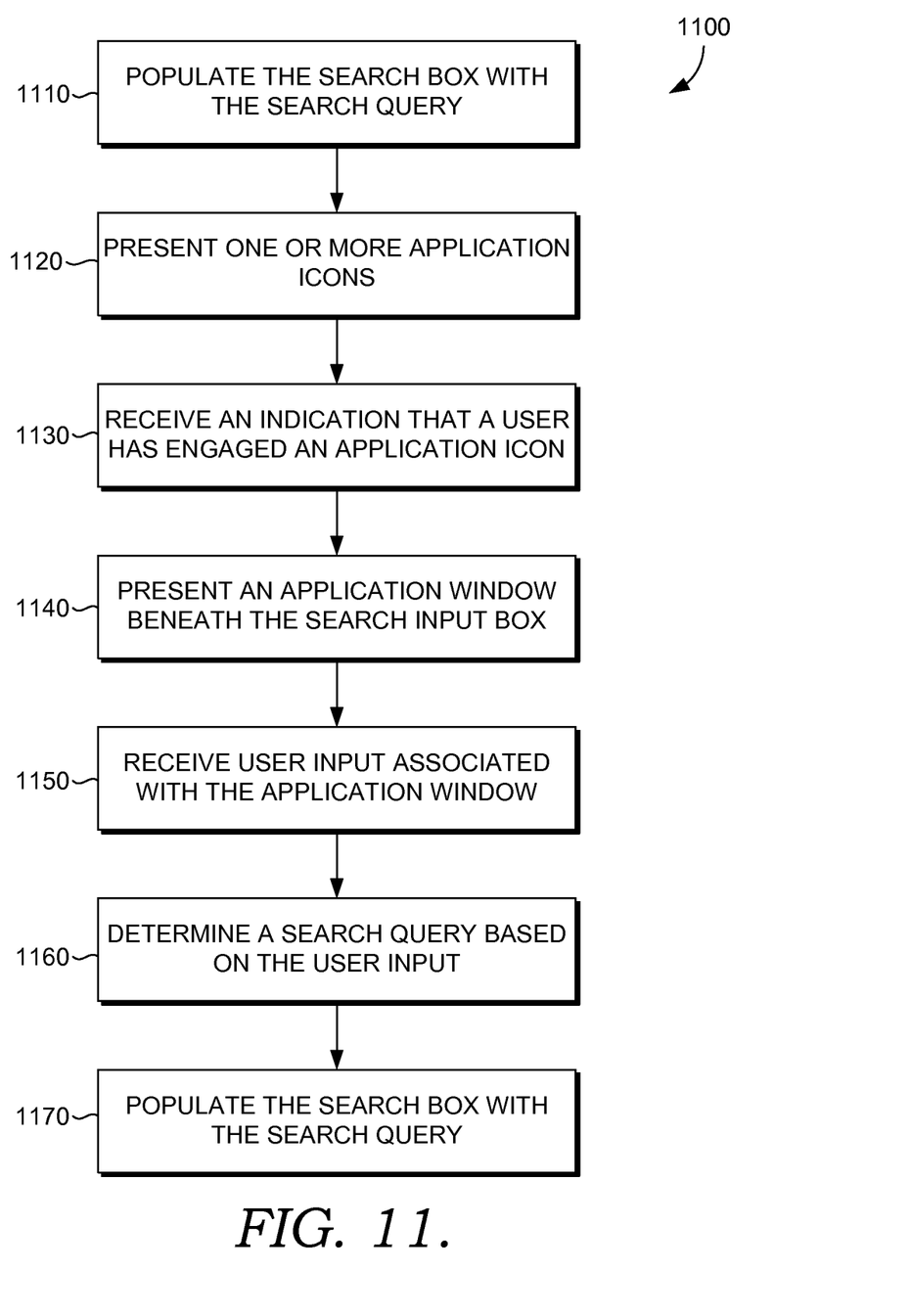
FIG. 11 is an additional flow diagram illustrating a method for organizing presentation of browser toolbars, in accordance with an embodiment of the present invention.

FIG. 11 is an additional flow diagram 1100 illustrating a method for organizing presentation of web browser toolbars, in accordance with an embodiment of the present invention. At step 1110, a toolbar of a web browser is presented. At step 1120, one or more application icons are presented. At step 1130, an indication is received that a user has engaged an application icon. At step 1140, an application window is presented beneath the search input box. At step 1150, user input associated with the application window is received. At step 1160, a search query is determined based on the user input. At step 1170, the search box is populated with the search query.

Figure 12:
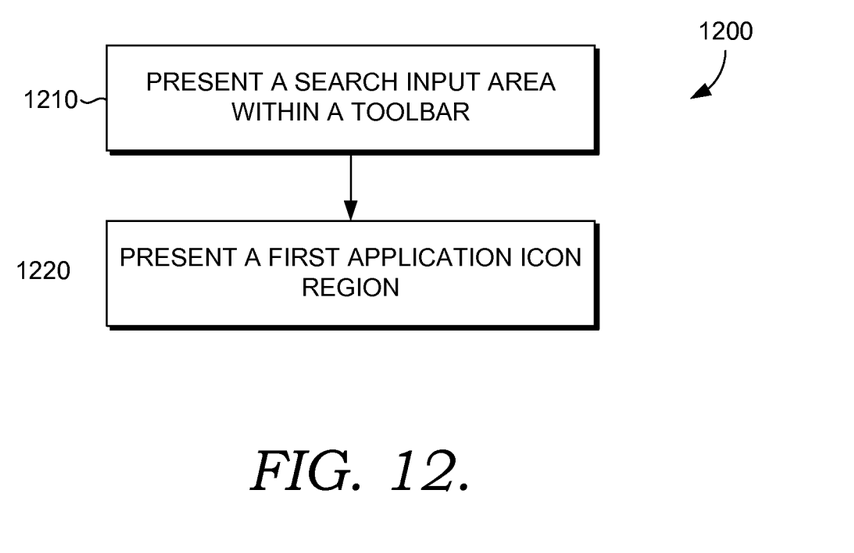
FIG. 12 is a flow diagram illustrating a method for presenting a user interface, in accordance with an embodiment of the present invention.

FIG. 12 is a flow diagram 1200 illustrating a method for presenting a user interface, in accordance with an embodiment of the present invention. At step 1210, a search input area is presented within a toolbar of a web browser. The search input area may be presented in a central location of the toolbar. In particular, the search input area may be presented at a centralized location of the toolbar. At step 1220, a first application icon region is presented to the left of the search input area. The first application icon region may be presented within a centralized location of the web toolbar and directly to the left of the search input area. The first application icon region comprises one or more application icons.

The method may further comprise presenting an application window beneath the search input area when an application icon of the one or more application icons has been engaged. The application window may be attached to the search input area. Alternatively, the application window may be detached from the search input area. Further, the application window may contain content associated with the one or more application icons that have been engaged.

The method may additionally comprise presented a suggested search query within the search input area of the toolbar. The suggested search query may be based on content within the application panel. Further, the method may comprise presenting a second application icon region to the right of the search input area. The second application icon region may comprise one or more application icons. Additionally, the second application icon region may be presented within a centralized location of the web toolbar and directly to the right of the search input area.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention.

It will be understood that certain features and subcombinations are of utility and may be employed without reference to other features and subcombinations and are contemplated within the scope of the claims. Not all steps listed in the various figures need be carried out in the specific order described.

The invention claimed is:

1. A system for organizing presentation of web browser toolbars, comprising:
one or more processors configured to:
present a toolbar of a web browser, the toolbar having a search input area; and
present one or more application icons on each of at least two sides of the search input area, wherein the one or more application icons are presented directly next to the search input area;
upon receipt of an indication that a user has engaged a first application icon of the one or more application icons, present a first application window comprising content associated with the application icon, wherein the first application window is presented directly beneath the search input area of the toolbar such that the content associated with the application icon is utilized at least in part as a suggested search query for the search input area;
receive user input associated with the first application window;
determine the suggested search query based on the user input and the content associated with the application icon; and
populate the search input area with the suggested search query.

2. The system of claim 1, wherein the one or more processors are further configured to present the search input area at a centralized location of the toolbar.

3. One or more hardware memory devices having computer-executable instructions embodied thereon for presenting a user interface, the user interface comprising:
a search input area within a toolbar of a web browser;
a first application icon region to the left of the search input area, the first application icon region comprising one or more application icons, wherein the one or more application icons are presented directly next to the search input area; and
upon receiving an indication that a user has engaged a first application icon of the one or more application icons, presenting a first application window comprising content associated with the application icon, wherein the first application window is presented directly beneath the search input area of the toolbar such that the content associated with the application icon is utilized to formulate a suggested search query;
receiving user input associated with the first application window;
determining the suggested search query based on the user input and the content associated with the application icon; and
populating the search input area with the suggested search query.

4. The one or more hardware memory devices of claim 3, wherein the search input area is presented in a central location of the toolbar.

5. The one or more hardware memory devices of claim 3, wherein the first application window is attached to the search input area.

6. The one or more hardware memory devices of claim 3, wherein the first application window is detached from the search input area.

7. The one or more hardware memory devices of claim 3, wherein the application window contains content associated with the one or more application icons that have been engaged.

8. The one or more hardware memory devices of claim 3, wherein the search input area is presented at a centralized location of the web toolbar.

9. The one or more hardware memory devices of claim 8, wherein the first application icon region is presented within the centralized location of the web toolbar and directly to the left of the search input area.

10. The one or more hardware memory devices of claim 8, further comprising:
a second application icon region to the right of the search input area, the second application icon region comprising one or more application icons.

11. The one or more hardware memory devices of claim 10, wherein the second application icon region is presented within the centralized location of the web toolbar and directly to the right of the search input area.

12. A method for organizing presentation of web browser toolbars, the method comprising:
presenting a toolbar of a web browser, the toolbar having a search input area;
presenting one or more application icons on each of at least two sides of the search input area, wherein the one or more application icons are presented directly next to the search input area;
receiving an indication that a user has engaged a first application icon of the toolbar; and
presenting a first application window directly beneath the search input area of the toolbar, wherein the first application window comprises content associated with the application icon such that the content associated with the application icon is utilized at least in part as a suggested search query for the search input area;
receiving user input associated with the first application window;
determining the suggested search query based on the user input and the content associated with the application icon; and
populating the search input area with the suggested search query.

13. The method of claim 12, wherein the search input area is centered in the toolbar of the web browser.

14. The method of claim 12, further comprising:
receiving an update associated with the first application window;
determining a search query based on the update; and
populating the search area with the search query based on the update.

* * * * *